Dec. 4, 1956     J. L. BRADY     2,772,800
LOAD STABILIZER FOR LIFT TRUCKS
Filed Jan. 7, 1954     7 Sheets-Sheet 1

INVENTOR.
JOSEPH L. BRADY
BY Kenneth C. Witt
ATTY.

Dec. 4, 1956  J. L. BRADY  2,772,800
LOAD STABILIZER FOR LIFT TRUCKS
Filed Jan. 7, 1954  7 Sheets-Sheet 2

INVENTOR.
JOSEPH L. BRADY
BY Kenneth C. Witt
ATTY.

Dec. 4, 1956  J. L. BRADY  2,772,800
LOAD STABILIZER FOR LIFT TRUCKS
Filed Jan. 7, 1954  7 Sheets-Sheet 3

*INVENTOR.*
JOSEPH L. BRADY
BY Kenneth C. Witt
ATTY.

FIG. 8

INVENTOR.
JOSEPH L. BRADY
BY Kenneth C. Witt
ATTY.

Dec. 4, 1956  J. L. BRADY  2,772,800
LOAD STABILIZER FOR LIFT TRUCKS
Filed Jan. 7, 1954  7 Sheets-Sheet 6

INVENTOR.
JOSEPH L. BRADY
BY Kenneth C. Witt
ATTY.

Dec. 4, 1956  J. L. BRADY  2,772,800
LOAD STABILIZER FOR LIFT TRUCKS
Filed Jan. 7, 1954  7 Sheets-Sheet 7

*INVENTOR.*
JOSEPH L. BRADY
BY Kenneth C. Witt
ATTY.

_United States Patent Office_

2,772,800
Patented Dec. 4, 1956

2,772,800

LOAD STABILIZER FOR LIFT TRUCKS

Joseph L. Brady, Albion, Mich., assignor to Clark Equipment Company, a corporation of Michigan Application January 7, 1954, Serial No. 402,791

8 Claims. (Cl. 214—654)

My present invention relates, in general, to material handling devices, and, more particularly, to a stabilizing mechanism for engaging the upper portion of a load supported by load carrying means mounted, for example, to an industrial truck.

In the preferred embodiments of my invention, vertical frame means is secured to the upwardly and downwardly movable load supporting carriage of an industrial truck, which carriage serves to support forwardly projecting load carrying means, such as horizontal fork means or clamp means. Normally forwardly projecting, horizontal, load engaging stabilizing means is mounted for vertical movement within the frame means, and motor means, in the form of a hydraulic piston and cylinder assembly, is employed for effecting movement of the load engaging stabilizing means within the frame means. The load engaging means serves to engage or grip the upper portion of a load supported by the load carrying means for exerting a downward pressure thereon.

It is an object of my present invention to provide load engaging stabilizing means of the character described, which may be swung automatically to a substantially vertical non-load-engaging position when its use is not desired.

In the accomplishment of the afore-noted object, I provide latch means for normally locking the load engaging means in a horizontal load-engaging position. I further provide means which is carried by the frame means and is engageable with the latch means for automatically disposing the latter in a non-locking position upon lowering of the load engaging means below a predetermined point.

The load engaging means is formed with at least one cam recess, the walls of which are engageable by pin means secured to the frame means for automatically swinging the load engaging means to a substantially vertical non-load-engaging position upon further lowering of the latter below said predetermined point.

It is a feature of my present invention that the pin means, through engagement with the cam recess walls, serves to automatically return the load engaging means to a horizontal load engaging position upon elevation of the latter toward the said predetermined point whereupon the latch means is permitted to become operative for locking the load engaging means in the horizontal position.

Now, in order to acquaint those skilled in the art with the manner of constructing and using load engaging means, in accordance with the principles of my present invention, I shall describe in connection with the accompanying drawings, preferred embodiments of my present invention.

Referring now to Figures 1 through 4, there is shown an industrial truck, indicated generally by the reference numeral 10, which comprises a main frame 11, to which, at the forward end thereof, is mounted a pair of driving wheels 12, and, at the rear end thereof, is mounted a pair of dirigible wheels 13. The truck 10 is further provided with a conventional hand steering wheel 14 mounted at the upper end of a steering column 15 which has connection, at its lower end, through suitable linkage means (not shown), with the rear dirigible wheels 13.

Figure 1:
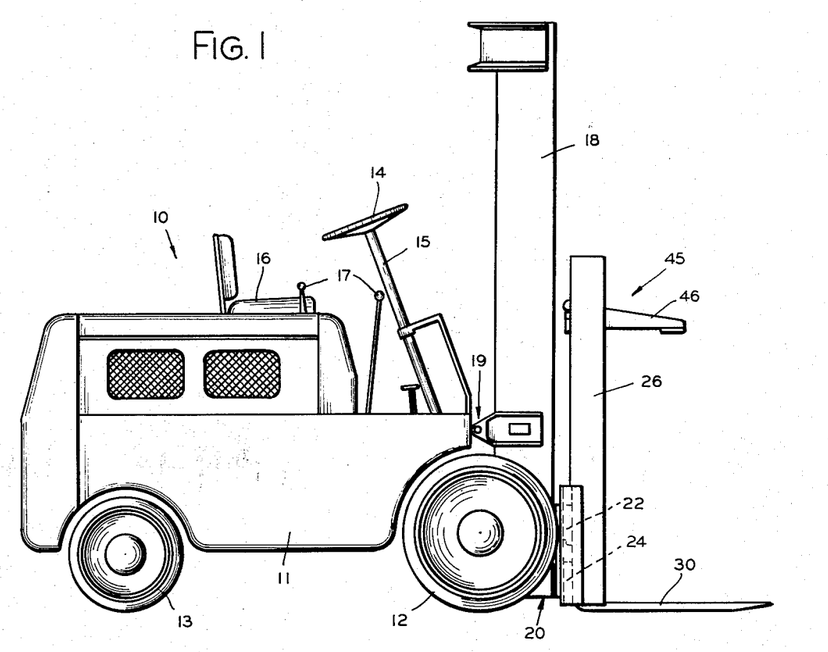
Figure 1 is a side elevational view of a truck to which, at the forward end, one embodiment of the load engaging stabilizing means of my present invention has been mounted.
Figure 2:
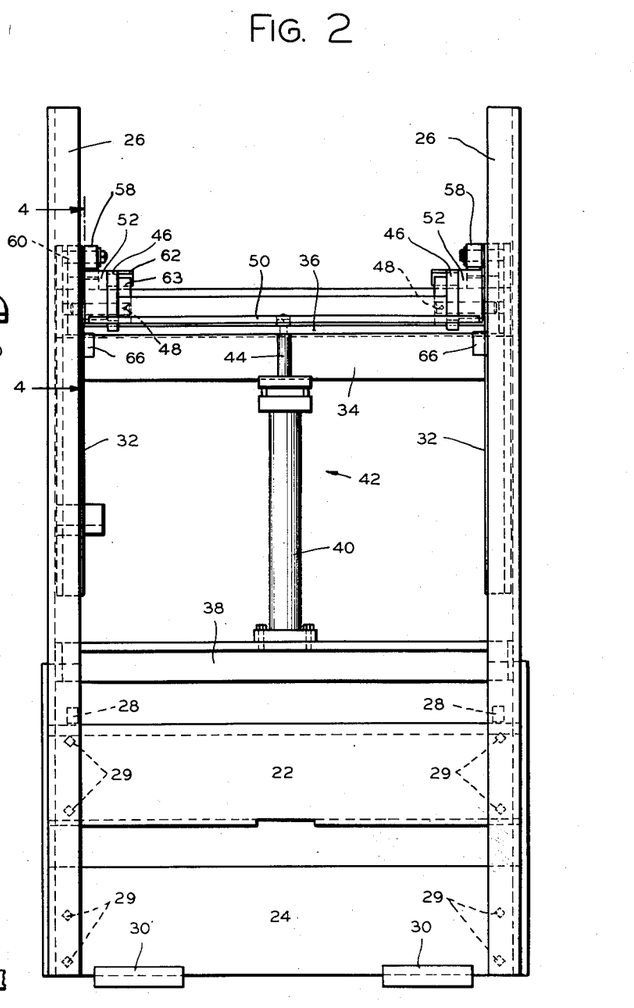
Figure 2 is a front elevational view of the load engaging means of Figure 1.
Figure 3:
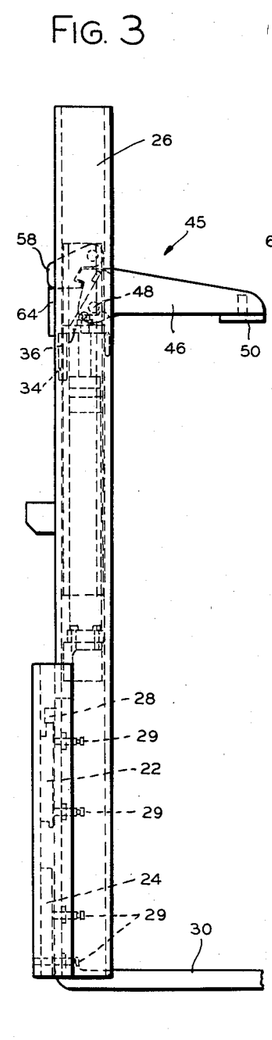
Figure 3 is a side elevational view of the load engaging means of Figure 1.
Figure 4:
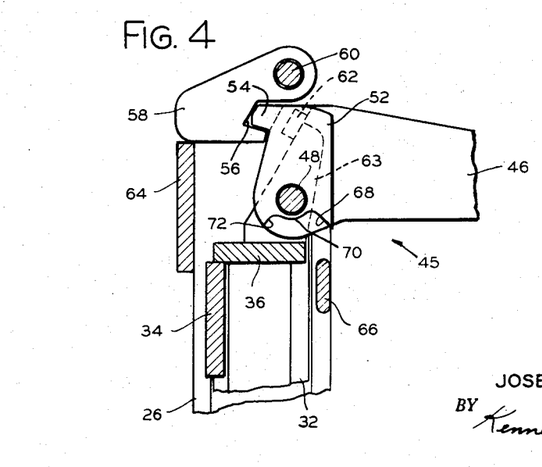
Figure 4 is an enlarged partial sectional view along the line 4—4 of Figure 2 with the load engaging stabilizing means in a horizontal position.

Mounted on an upper portion of the frame 11 is an operator's seat 16. Suitable control levers 17 are disposed adjacent the driver's seat 16 for controlling the truck and the various devices associated therewith. Pivotally mounted to the main frame 11, adjacent the forward end thereof, is the lower end of a substantially vertically extending mast 18 which may be tilted from its normal vertical position by means of conventional tilting mechanism, indicated generally by the reference numeral 19. Mounted for vertical movement within the mast 18 is a conventional load supporting carriage indicated generally by the reference numeral 20.

The forward surface of the load supporting carriage 20 carries a pair of vertically spaced transversely extending plate members 22 and 24. One embodiment of my present invention is secured to the plate members 22 and 24 and comprises frame means which includes vertically extending U-shaped outer channel members 26 arranged at each end of the transverse plate members 22 and 24. Secured to the rear leg of each channel member 26 (see Fig. 3) is a block 28 which is supported on the upper edge of the upper transverse plate member 22. In addition, the channel members 26 are suitably secured, as by bolts 29, to the upper and lower transverse plate members 22 and 24. Forwardly extending load carrying means in the form of horizontal load supporting means 30 is secured and supported at its rear end, in a conventional manner, by the transverse plate members 22 and 24. The load supporting means 30 may be provided as individual horizontally spaced fork frames or as a solid apron plate, as will be understood by those skilled in the art.

Slidably mounted in the outer channel members 26 are inner U-shaped channel members 32 which are rigidly interconnected by cross members 34 and 36.

The outer channel members 26 are interconnected intermediate of their ends by a cross member 38 to which is secured the cylinder 40 of a hydraulic piston and cylinder assembly, indicated generally by the reference numeral 42. The hydraulic assembly 42 further comprises a piston rod 44 which is suitably connected to the cross member 36 of the inner channel members 32. By suitably admitting fluid under pressure to the lower end of the cylinder 40, as viewed in Figure 2, the piston rod 44 is distended upwardly thereby causing the inner channel members 32 to move upwardly within the outer channel members 26. Likewise, when fluid under pressure is admitted to the upper end of the cylinder 40, as viewed in Figure 2, the piston rod 44 is retracted within the cylinder 40 and the channel members 32 are moved downwardly within the outer channel members 26.

The load engaging means of the first embodiment of my present invention, indicated generally at 45, is associated with the frame means comprising the channel members 26 and 32. The load steadying means 45 includes a pair of horizontally spaced arm members 46 which are pivotally mounted at their rear ends on pin members 48 carried by the inner channel members 32. A transversely extending plate member 50 is secured at its ends to the outer ends of the arm members 46 and pivots therewith.

Block members 52 are secured to the outward sides of the rear ends of the arm members 46 and pivot therewith about the pin members 48. The upper rear corners of the blocks 52, as viewed in Figure 4, have projections 54 which engage recesses 56 of latch members 58. The latter latch members are pivotally mounted about an axis extending transversely of the truck on pin members 60 carried by the inner channel members 32. When the fingers 54 on the blocks 52 are disposed in the notches 56 of the latch members 58, the arm members 46 of the load stabilizing means are locked in a horizontal position whereby the load stabilizing means may be employed for steadying the upper portion of a load resting on the load supporting means 30. The arm members 46 are provided on the inward surfaces with stop members 62 which normally abut upwardly projecting members 63 located on transverse cross member 36 so as to prevent clockwise rotation of the load stabilizing means, from the position shown in Figure 4, under the force of gravity. The inner channel members 32 may be moved upwardly within the outer channel members 26 from the position shown in Fig. 4, without disturbing the relative positions of the arm members 46 and the latch members 58.

In operation, the truck 10 is driven toward the load that is to be engaged with the stabilizing means 45 in its uppermost position. If the load is arranged on a pallet, the load supporting means 30 is inserted therebeneath. In the alternative, the load, if consisting of boxes, bags or the like, may be manually piled upon the load supporting means 30. Then the stabilizing means 45 is lowered, through actuation of the hydraulic piston and cylinder 42, until it engages or grips the upper portion of the load so as to steady the load. The load supporting carriage 20 is elevated, in a conventional manner, so that the load supporting means and load will be cleared from the ground and the truck 10 may then be driven to the location where the load is to be deposited. There the load engaging means 45 is elevated so as to free the load, and the load supporting means 30 lowered to the ground and withdrawn from beneath the pallet. The truck, at this point, is free for another operation.

When it becomes desirable to employ the load supporting means 30 independently of the load engaging means 45, it becomes necessary to swing the load engaging means 45 to a substantially vertical non-load-engaging position. To effect such swinging movement of the load engaging means 45, I have provided automatically operable means which I shall now describe in detail.

Transversely projecting release bars 64 are secured at their one ends in the rear legs of the outer channel members 26. The release bars 64 are so positioned vertically that as the piston rod 44 of the hydraulic assembly 42 is retracted within the cylinder 40 and nears the end of its inward stroke, the outer ends of the latch members 58 engage the upper edges of the bars 64 causing clockwise pivotal movement of the latch members 58 about the pin members 60 thereby retracting the latch member 58 from the projections 54 of the block members 52. Thereafter, the arm members 46 of the load stabilizing means 45 are no longer locked in a horizontal position.

Figure 5:
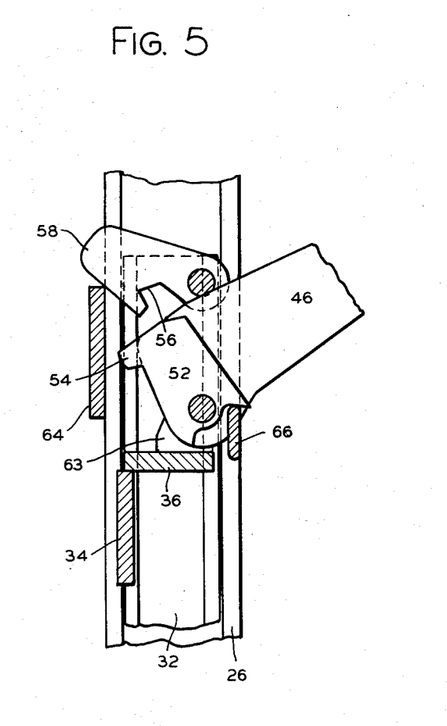
Figure 5 is a view of approximately the same portion of the mechanism as Figure 4 but with the stabilizer arm partially retracted.
Figure 6:
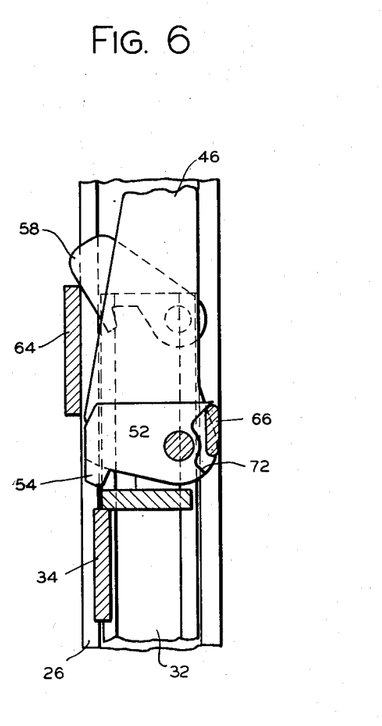
Figure 6 is a view of approximately the same portion of the mechanism as Figures 4 and 5 with the stabilizer arm fully retracted to a vertical position.

Pin or bar members 66 are rigidly secured in the forward legs of the outer channel members 26 and as the load stabilizing means 45 is moved to its lowermost position, the pins 66 engage the walls 68 of cam recesses 70 formed in the block members 52. The location of the various parts when this occurs is illustrated in Fig. 5. The pin members 66 upon engagement with the cam recess walls 68 cause counter-clockwise pivotal movement of the block members 52, together with the arm members 46 and the plate member 50, so as to thereby swing the load engaging means 45 to a substantially vertical non-load-steadying position as illustrated in Fig. 6.

When it is desired again to employ the load engaging means 45, fluid pressure need only be admitted to the lower end of the cylinder 40 for effecting outward movement of the piston rod 44 which will cause upward movement of the inner channel members 32. As the inner channel members 32 move upwardly, the pin members 66 will engage the walls 72 of the cam recesses 70 and will thereby effect clockwise movement of the block members 52 together with the arm members 46 and the plate member 50. Also, as the arm members 46 are returned to a substantially horizontal position, during initial elevation of the inner channel members 32, the outer ends of the latch members 58 will be moved away from the release bar 64 and the fingers 54 will be permitted to drop into the recesses 56 formed in the latch members 58 for again locking the arm members 46 in a load-steadying position. The arm members 46 remain locked in a horizontal position except when disposed in their lowermost position.

Referring now to Figures 7 through 12, I shall describe another embodiment of my present invention. The industrial truck attachment in which this form of my invention is embodied includes clamping and rotating means for supporting the load instead of forks as in the first embodiment.

Shown at 80 (see Fig. 7) is a plate member which is adapted to be secured by means of bracket members 81 (see Figs. 8 and 9) to the load supporting carriage of an industrial truck. The plate member 80 supports clamp means which comprise vertically spaced, transversely extending, guide members 82. Slidably mounted within the guides 82 and projecting outwardly at the ends thereof are inner members 83 the ends of which are secured to vertical, horizontally spaced, forwardly projecting, clamp arm frames 84.

Pivotally mounted in the outer ends of the clamp arm frames 84 are stub shafts 85 which are rotatable about an axis extending transversely of the industrial truck. The inner ends of the stub shafts 85 support clamp pads 86. The clamp pads 86 are rotatable about a transverse axis conjointly in view of the telescopic tie rod assembly, indicated generally at 87 in Figure 9, which interconnects the one ends of the clamp pads 86. The clamp arms may be arranged for rotation by a suitable mechanism enclosed within one of frames 84. In a typical case the rotating mechanism may comprise a pinion sprocket secured to one of the stub shafts 85, a sprocket gear adapted to be rotated a limited amount, and a chain interconnecting the two sprockets. Rotary movement of the clamp pads 86 then may be effected through a crank arm connected to the sprocket gear and moved by means of a hydraulic piston and cylinder assembly. It is necessary only that one of the stub shafts 85 be powered, because other stub shaft will be rotated by the telescopic tie rod assembly 87. The clamp arm frames 84 and associated clamp pads 86, as illustrated, are adapted to be moved transversely of the industrial truck toward and away from each other for clamping a load between them by means of hydraulic piston and cylinder assemblies, indicated generally at 93 which are pivotally mounted at their one ends to the plate member 80 and at their other ends to the clamp arm frames 84.

The load engaging stabilizing means of the second embodiment of my present invention comprises frame means which include vertically extending, horizontally spaced, U-shaped, outer, channel members 95 which are secured to the upper edge of the plate member 80.

Slidably mounted in the outer channel members 95 are inner, U-shaped, channel members 96 which have secured thereto inwardly facing, generally triangular shaped, gusset plate members 98 which along their upper edges provide support for a transversely extending, frame assembly 100. The ends of the frame assembly 100 are spaced from the adjacent inner channel members 96 so as to accommodate load engaging means 101 which comprises arm members 102 swingable on pin members 104 secured in, and extending between, the inner channel members 96 and the ends of the transverse frame assembly 100.

Upward and downward pivotal movement of the load engaging means 101 is adapted to be effected by means of a vertically extending hydraulic piston and cylinder assembly, indicated generally by the reference numeral 106. The hydraulic assembly 106 comprises a cylinder 108, which is pivotally mounted at 110 to the upper edge of plate 80 of the clamp means described hereinbefore, and a piston rod 112, which, at its upper outer end, is secured to the transversely extending frame assembly 100.

Figure 7:
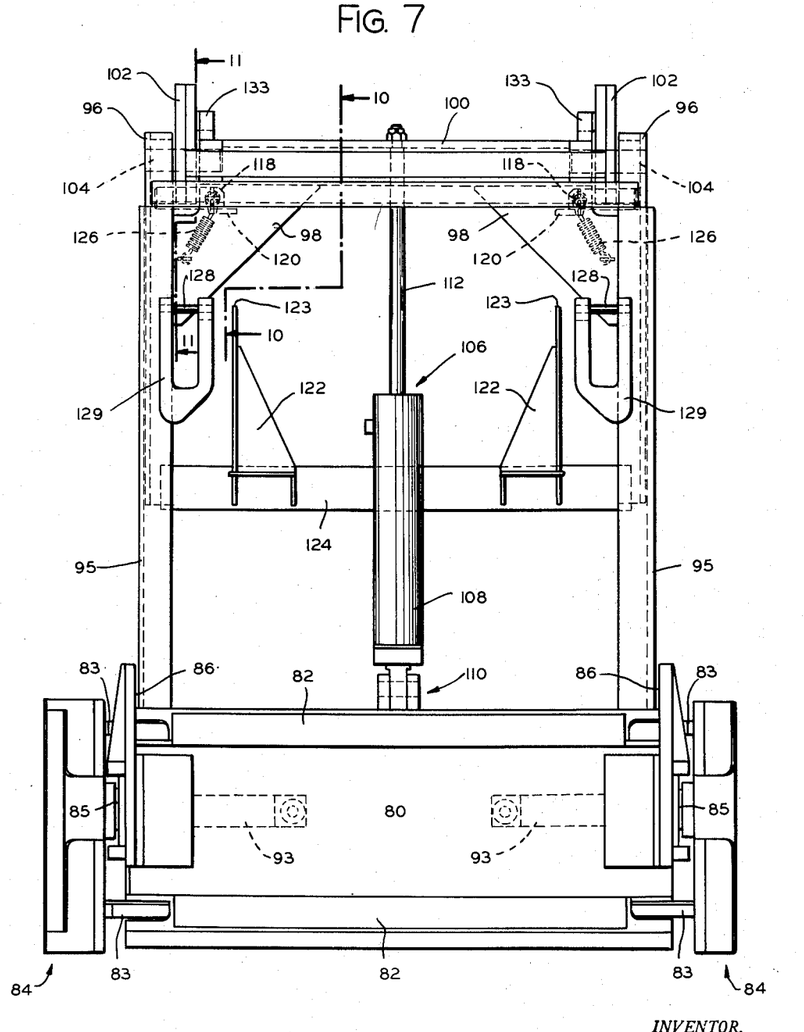
Figure 7 is a front elevational view of a second embodiment of the load engaging means of my present invention.
Figure 8:
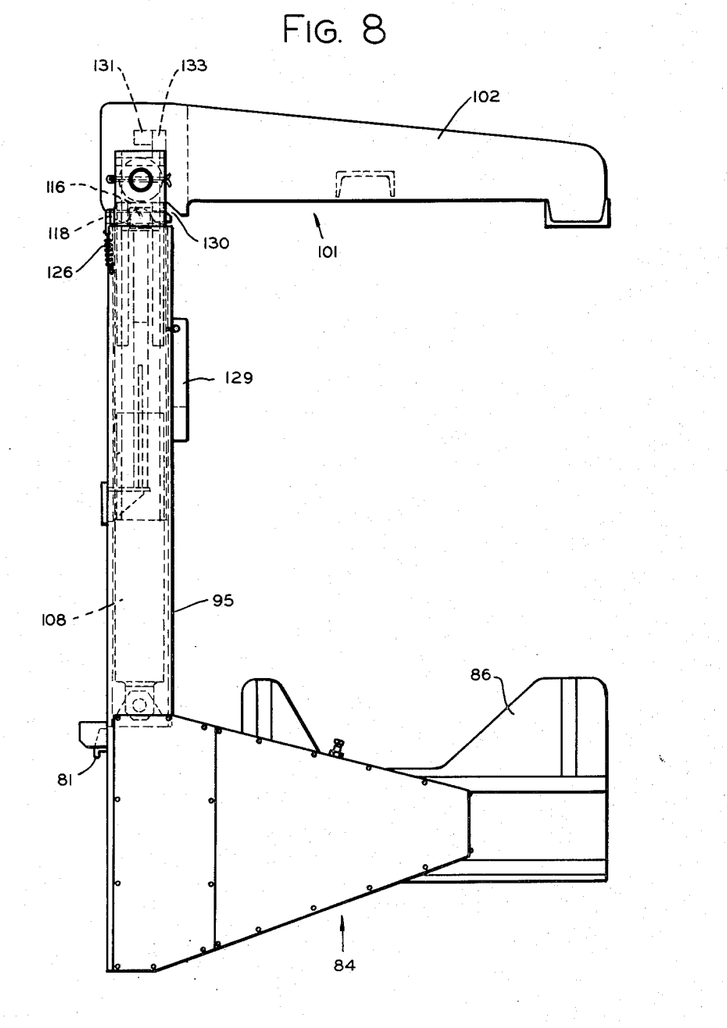
Figure 8 is a side elevational view of the mechanism of Figure 7.
Figure 9:
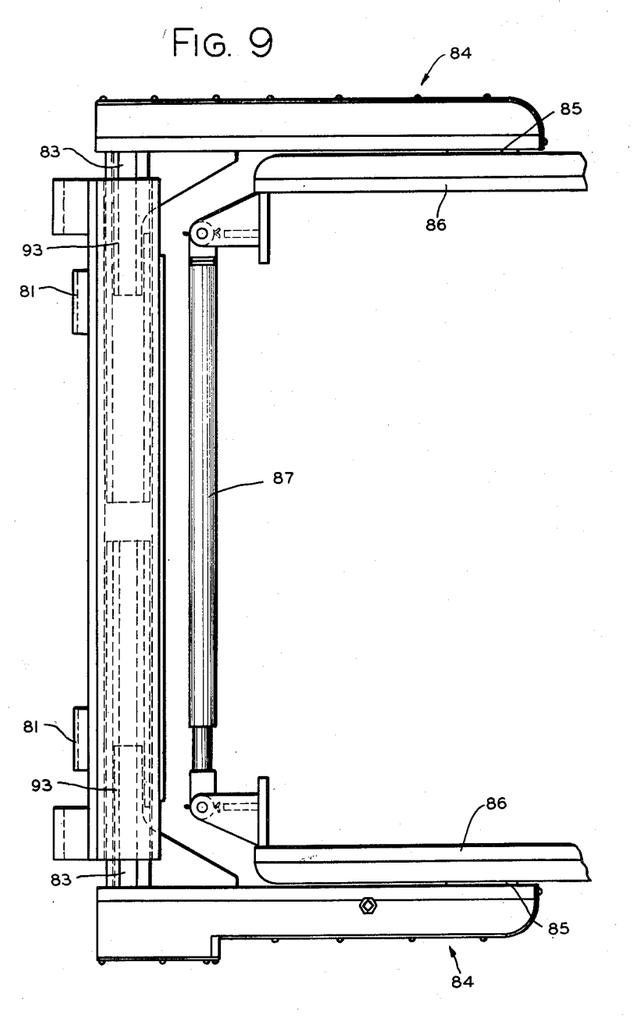
Figure 9 is a plan view of the clamp means included in the mechanism of Figure 5.
Figure 10:
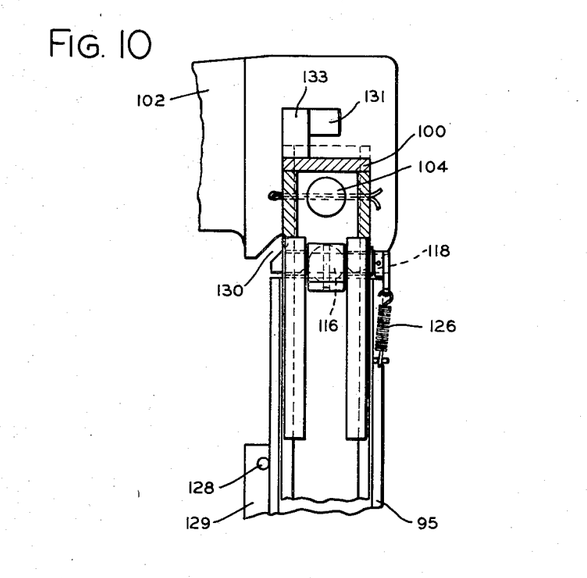
Figure 10 is an enlarged partial sectional view of the stabilizer arm of Figure 7 along the line 10—10.

By suitably admitting fluid under pressure to the lower end of the cylinder 108, as viewed in Figure 7, the piston 112 is distended upwardly thereby causing the inner channel members 96, together with the load engaging means 101, to move upwardly within the outer channel members 95. Likewise, when fluid under pressure is admitted to the upper end of the cylinder 108, as viewed in Figure 7, the piston rod 112 is retracted within the cylinder 108 and the channel members 96, together with the load engaging means 101, are moved downwardly within the outer channel members 95.

The aforedescribed arm members 102, on their undersides, are notched at 114 to receive transversely extending cylindrical bar members 116 which constitute the latch means for locking the load engaging arms 102 in a normally forwardly, horizontally projecting position. See Figs. 11 and 12 particularly for the details of notch 114. The inner channel members 96 may be moved upwardly and downwardly within the outer channel members 95 and without disturbing the relative positions of the arm members 102 and the latch bars 116, provided they are not moved below a certain position beyond which the arms 102 will retract as described hereinafter.

The latch bars 116 are pivotally mounted on pins 118 which extend parallel to the longitudinal axis of the industrial truck. Secured to the forward ends of the pins 118 are foot members 120 which are engageable, when the inner channel members 96 are lowered, by the upper margins 123 of plate assembly means 122. As shown in Figure 7, the plate assembly means 122 are carried by a support member 124 which extends transversely of the truck and is secured at its ends to the outer relatively fixed channel members 95. When the foot members 120 are engaged by the upper margins 123 of the plate assembly means 122, the latch bars 116 are pivoted away from the notches 114 formed in the load engaging arm members 102 thereby permitting the latter arm members to be pivoted freely to a non-load-engaging position. The latch bars 116 are normally biased toward a locking position by means of springs 126 which are anchored to the triangular gusset plates 98.

The last described embodiment of my present invention is particularly adapted for packing boxes, crates and the like. For example, in the meat industry, it is common to place hams or the like in a box and employ power means for pressing a cover tightly into position. The load engaging means of the present invention serves as such power means. Assuming that a box has been loosely packed manually with items such as hams, the truck having my invention attached thereto may be driven toward the box with the load engaging means 101 in its upper most position, and with the clamp arms 84 spread apart. After the clamp arm assemblies 84 have been disposed at the sides of the box to be engaged, fluid under pressure is admitted to the hydraulic piston and cylinder assemblies 93 for causing the clamp arm assemblies 84 to be moved toward each other thereby securely clamping the sides of the load. Then, after a cover has been laid over the hams, the load engaging arm members 102, while locked in a horizontal position, are moved downwardly by actuation of the hydraulic piston and cylinder assembly 106 and are employed for exerting a downward pressure on the cover of the box thereby pressing the hams or other goods compactly into the box and disposing the lid into engagement with the body of the box so that the latter may be attached thereto by a suitable latch.

At this point, the load supporting carriage of the industrial truck may be elevated for moving the load from the ground so as to thereby permit it to be transported to another location. At the point of deposit, the load may be lowered to the ground and the load engaging arm members 102 elevated, whereupon the clamp arms 84 may be spread for releasing the box. In the alternative, the lid of the box may be unlatched and the clamp pads 86 rotated for upending and dumping the contents of the box. In the latter instance, after the contents of the box have been emptied, the clamp pads 86 may be rotated back to their normal position, whereupon the clamp arms 84 may be spread for releasing the box. The truck then is free for another operation.

It oftentimes becomes desirable to employ the clamp arm assemblies 84 independently of the load engaging means 101. It is for this reason that the load engaging arm members 102 are mounted so that they may be swung to a vertical non-load-engaging position. To effect such swinging movement of the load engaging arm members 102 automatically, the aforedescribed latch bars 116 and plate assemblies 122 are provided. That is, when the hydraulic assembly 108 is actuated for retracting the piston rod 112, and the latter nears the end of its inward stroke, the upper margins 123 of the plate assembly means 122 engage the foot members 120 for causing the latch bar members 116 to pivot about their pivot pins 118 and out of the notches 114 formed in the underside of the load engaging arm members 102. Thereafter, the arm members 102 are no longer locked in a horizontal position.

Figure 11:
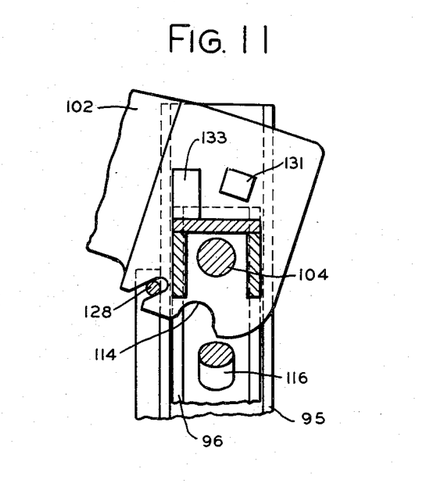
Figure 11 is an enlarged view along the line 11—11 of Figure 7 except with the stabilizer arm partially retracted.
Figure 12:
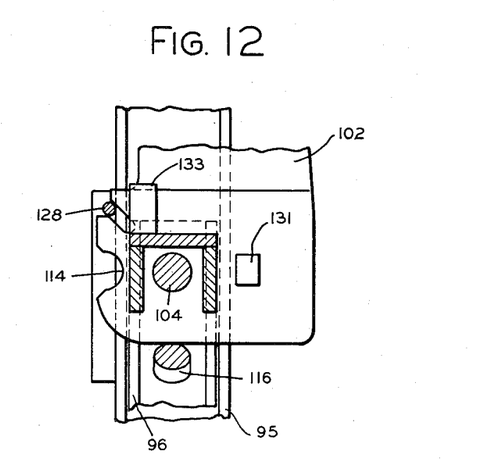
Figure 12 is a view the same as Figure 11 with the stabilizer arm fully retracted.

Transversely disposed pin members 128 are secured by means of brackets 129 to the forward legs of the outer channel members 95 and as the load engaging arm members 102 are moved to their lowermost position, the pins 128 engage the walls of cam recesses 130 formed in the underside of the load engaging arm members 102. The pin members 128, upon engagement with the walls of the cam recesses 130, cause counter-clockwise pivotal movement of the arm members 102, as viewed in Figure 8 (clockwise in Figs. 10, 11 and 12), so as to thereby swing the load engaging means to a substantially vertical, non-load-engaging position. Figures 11 and 12 respectively show the arms 102 partially and fully retracted.

When it is desired to again employ the load engaging arms 102, fluid under pressure need only be admitted to the lower end of the cylinder 108 for effecting outward movement of the piston rod 112 which will cause upward movement of the inner channel members 96. As the inner channel members 96 move upwardly, the pin members 128, engaging the walls of the cam recesses 130, will effect downward pivoting movement of the load engaging arm members 102 toward the horizontal position. As the arm members 102 are returned to a substantially horizontal position, during initial elevation of the inner channel members 96, the outer ends of the foot members 120 of the latch bars 116 will be moved away from the margins 123 of the plate assembly means 122 and the latch bars 116 will be permitted to spring back into the recesses 114 formed in the load engaging arm members 102 for again locking the latter in a horizontal load-engaging position. If desired the arms 102 may be provided with projections 131 which engage stop members 133 on frame member 100 to positively stop the downward motion of the arms 102 at the horizontal position. As in the previous embodiment of my invention described hereinbefore, the arm members 102 will remain locked in a horizontal position except when disposed in their lowermost retracted position.

Now, while I have shown and described what I believe to be preferred embodiments of my present invention, it will be understood that various rearrangements and modifications may be made therein without departing from the spirit and scope of my present invention.

I claim:

1. For use with an industrial truck having an upwardly and downwardly movable load supporting carriage and forwardly projecting load carrying means secured to the load supporting carriage, the combination of vertical frame means secured to the load supporting carriage, normally forwardly projecting horizontal load engaging means vertically movable in said frame means above the load carrying means for engaging the upper portion of a load supported by the load carrying means, means for vertically moving said load engaging means within said frame means, and means carried by said frame means for automatically swinging said load engaging means to a substantially vertical non-load-engaging position upon lowering of the latter below a predetermined point.

2. For use with an industrial truck having an upwardly and downwardly movable load supporting carriage and forwardly projecting load carrying means secured to the load supporting carriage, the combination of vertical frame means secured to the load supporting carriage, normally forwardly projecting horizontal load engaging means vertically movable in said frame means above the load carrying means for engaging the upper portion of a load supported by the load carrying means, means for vertically moving said load engaging means within said frame means, means carried by said frame means for automatically swinging said load engaging means to a substantially vertical non-load-engaging position upon lowering of the latter below a predetermined point, and said last-named means serving to automatically return said load engaging means to a horizontal load-engaging position upon elevation of the latter above the said predetermined point.

3. For use with an industrial truck having an upwardly and downwardly movable load supporting carriage and forwardly projecting load carrying means secured to the load supporting carriage, the combination of vertical frame means secured to the load supporting carriage, normally forwardly projecting horizontal load engaging means vertically movable in said frame means above the load carrying means for engaging the upper portion of a load supported by the load carrying means, means for vertically moving said load engaging means within said frame means, said load engaging means having at least one cam recess, pin means carried by said frame means and adapted to engage the walls of said cam recess for automatically swinging said load engaging means to a substantially vertical non-load-engaging position upon lowering of the latter below a predetermined point, and said pin means through engagement with said cam recess walls serving to automatically return said load engaging means to a horizontal load-engaging position upon elevation of the latter above the said predetermined point.

4. For use with an industrial truck having an upwardly and downwardly movable load supporting carriage and forwardly projecting load carrying means secured to the load supporting carriage, the combination of vertical frame means secured to the load supporting carriage, swingable load engaging means vertically movable in said frame means above the load carrying means, means for vertically moving said load engaging means within said frame means, means for locking said load engaging means in a horizontal position whereby the latter may be employed for engaging the upper portion of a load supported by the load carrying means, and means carried by said frame means for automatically rendering said locking means inoperative upon lowering of the load engaging means below a predetermined point so that the latter may be swung to a substantially vertical non-load-engaging position.

5. For use with an industrial truck having an upwardly and downwardly movable load supporting carriage and forwardly projecting load carrying means secured to the load supporting carriage, the combination of vertical frame means secured to the load supporting carriage, swingable load engaging means vertically movable in said frame means above the load carrying means, means for vertically moving said load engaging means within said frame means, means for locking said load engaging means in a horizontal position whereby the latter may be employed for engaging the upper portion of a load supported by the load carrying means, means carried by said frame means for automatically rendering said locking means inoperative upon lowering of the load engaging means below a predetermined point, and means carried by said frame means for automatically swinging said load engaging means to a substantially vertical non-load-engaging position upon further lowering of the latter below said predetermined point.

6. For use with an industrial truck having an upwardly and downwardly movable load supporting carriage and forwardly projecting load carrying means secured to the load supporting carriage, the combination of vertical frame means secured to the load supporting carriage, swingable load engaging means vertically movable in said frame means above the load carrying means, means for vertically moving said load engaging means within said frame means, latch means for locking said load engaging means in a horizontal position whereby the latter may be employed for engaging the upper portion of a load supported by the load carrying means, means carried by said frame means and engageable with said latch means for automatically disposing said latch means in a non-locking position upon lowering of the load engaging means below a predetermined point, said load engaging means having at least one cam recess, pin means carried by said frame means and adapted to engage the walls of said cam recess for automatically swinging said load engaging means to a substantially vertical non-load-engaging position upon further lowering of the latter below said predetermined point, and said pin means through engagement with said cam recess walls serving to automatically return said load engaging means to a horizontal load-engaging position upon elevation of the latter toward the said predetermined point whereupon the latch means is permitted to become operative for locking said load engaging means in the horizontal position.

7. For use with an industrial truck having an upwardly and downwardly movable load supporting carriage and forwardly projecting horizontal load supporting means secured to the load supporting carriage, the combination of vertical frame means secured to the load supporting carriage, swingable load stabilizing means including arm members vertically movable in said frame means above the load supporting means, means for vertically moving said load stabilizing means within said frame means, at least one latch member pivotally mounted to said frame means about an axis extending transversely of the truck and engageable with a notch formed in the rear end of an arm member of said load stabilizing means for locking the latter in a horizontal position whereby the same may be employed for steadying the upper portion of a load supported on the load supporting means, bar means carried by said frame means and engageable with said latch member for automatically disposing said latch member in a non-locking position upon lowering of the stabilizing means below a predetermined point, said load stabilizing means having at least one cam recess, pin means carried by said frame means and adapted to engage the walls of said cam recess for automatically swinging said load stabilizing means to a substantially non-load-steadying position upon further lowering of the stabilizing means below said predetermined point, and said pin means through engagement with said cam recess walls serving to automatically return said load stabilizing means to a horizontal load-steadying position upon elevation of the stabilizing means toward the said predetermined point whereupon the latch member is permitted to become operative for locking said load stabilizing means in the horizontal position.

8. For use with an industrial truck having an upwardly and downwardly movable load supporting carriage and forwardly projecting load carrying means secured to the load supporting carriage, the combination of vertical frame means secured to the load supporting carriage, swingable load engaging means including arm members vertically movable in said frame means above the load carrying means, means for vertically moving said load engaging means within said frame means, at least one latch member pivotally mounted to said frame means about an axis extending lengthwise of the truck and engageable with a notch formed in the underside of an arm member of said load engaging means for locking the latter in a horizontal position whereby the same may be employed for engaging the upper portion of a load supported by the load carrying means, plate means carried by said frame means and engageable with said latch member for automatically disposing said latch member in a non-locking position upon lowering of the load engaging means below a predetermined point, said load engaging means having at least one cam recess, pin means carried by said frame means and adapted to engage the walls of said cam recess for automatically swinging said load engaging means to a substantially vertical non-load-engaging position upon further lowering of the latter below said predetermined point, and said pin means through engagement with said cam recess walls serving to automatically return said load engaging means to a horizontal load-engaging position upon elevation of the latter toward the said predetermined point whereupon the latch member is permitted to become operative for locking said load engaging means in the horizontal position.

References Cited in the file of this patent

UNITED STATES PATENTS

| | | |
|---|---|---|
| 1,763,351 | Gfrorer | June 10, 1930 |
| 1,826,489 | Abbe | Oct. 6, 1931 |
| 2,520,564 | Reagle | Aug. 29, 1950 |
| 2,578,016 | Rike | Dec. 11, 1951 |
| 2,578,802 | Heidrick et al. | Dec. 18, 1951 |
| 2,589,102 | Tourneau | Mar. 11, 1952 |
| 2,613,829 | Gault | Oct. 14, 1952 |
| 2,633,260 | Sutherland | Mar. 31, 1953 |

FOREIGN PATENTS

| | | |
|---|---|---|
| 144,506 | Australia | Dec. 28, 1951 |